United States Patent [19]

Little

[11] Patent Number: 6,014,051

[45] Date of Patent: *Jan. 11, 2000

[54] CURRENT COMPENSATED CLOCK FOR A MICROCIRCUIT

[75] Inventor: Wendell L. Little, Denton, Tex.

[73] Assignee: Dallas Semiconductor Corporation, Dallas, Tex.

[*] Notice: This patent is subject to a terminal disclaimer.

[21] Appl. No.: 09/156,889

[22] Filed: Sep. 18, 1998

Related U.S. Application Data

[63] Continuation of application No. 08/736,002, Oct. 23, 1996, Pat. No. 5,812,004.

[51] Int. Cl.[7] .......................................................... H03L 1/00

[52] U.S. Cl. ........................................... 327/291; 327/114

[58] Field of Search .................................... 327/291, 299, 327/113, 114; 331/176, 179, 185, 186

[56] References Cited

U.S. PATENT DOCUMENTS

| 4,812,733 | 3/1989  | Tobey ........................................ 323/285 |
| 5,167,024 | 11/1992 | Smith et al. ............................ 395/375 |
| 5,463,352 | 10/1995 | Chen ........................................ 331/1 R |
| 5,563,928 | 10/1996 | Rostoker et al. ....................... 377/20 |
| 5,568,083 | 10/1996 | Echiyama et al. ..................... 327/538 |

*Primary Examiner*—Tuan T. Lam
*Attorney, Agent, or Firm*—Jenkens & Gilchrist, A Professional Corporation

[57] ABSTRACT

A circuit, for incorporation into an electrical system, for providing a clock signal frequency to other circuitry such as a microprocessor and/or co-processor circuitry. The clock signal frequency varies its speed depending on the available voltage and current from a host power source. The circuit maximizes clock frequency by lowering the available voltage and increasing the available supply current. The circuit can therefore provide a higher clock speed and more current for switching transistors.

1 Claim, 2 Drawing Sheets

CURRENT COMPENSATED CLOCK FOR A MICROCIRCUIT

This application is a continuation of Ser. No. 08/736,002 filed Oct. 23, 1996, now U.S. Pat. No. 5,812,004.

BACKGROUND OF THE INVENTION

1. Field of the Invention

This invention relates to circuitry that provides voltage and current to a microprocessor such that the voltage from a power source can be pulled down to thereby provide more current to the microprocessor and related circuitry. More particularly, this invention relates to circuitry which lowers the operating voltage of microprocessor circuitry to thereby increase current to the same circuitry and maximize the clock speed of the microprocessor circuitry.

2. Description of the Related Art

Most microprocessors and co-processors function using a fixed clock rate. The fixed clock rate is generally generated by a crystal oscillator. As microcircuits decrease in size and as the packages that microcircuits are placed in become smaller and smaller, a crystal oscillator will not fit in the packages because they are too large. Fixed crystal oscillators are generally used to properly time microprocessor-related operations. Such fixed crystal oscillators, in combination with a microprocessor, generally require a steady voltage and a steady current source to operate correctly and maintain the fixed operating clock frequency.

A ring oscillator circuit can be used in place of a fixed crystal oscillator. A ring oscillator can be used when the microprocessor is being used as a "number cruncher," that is, used to perform mainly mathematical functions without a need to operate time-related functions. Number crunching microprocessors and co-processors generally are concerned with the speed at which a calculation can be completed. Thus, the faster the ring oscillator runs, the higher the clock frequency and the faster the circuitry can "crunch numbers."

Using a ring oscillator to act as the oscillator for a microprocessor or co-processor is not new. Ring oscillators have been used for years. Ring oscillator circuitry can be smaller than a crystal oscillator. However, a fixed frequency ring oscillator is what is generally used. A drawback of a fixed frequency ring oscillator is that it must have a dependable constant current source in order to maintain its fixed frequency. If the current source to the circuitry is variable, the fixed frequency ring oscillator cannot function properly.

In a device where the power used by the device is provided by an outside source, the voltage and current supplied by the outside source or "host" may vary from host to host. That is, different hosts will provide different voltages and currents for the device's operation. Thus, a microprocessor-based device that, for example, is adapted to be connected to a variety host power sources must be able to operate with different voltage and current supplies available from the different hosts.

Voltage and current are related by the equation: Power= (Voltage) (Current). Thus, given a fixed amount of power from a host circuit, current can be increased by lowering the voltage. If enough current is supplied by a host to a microprocessor, then the voltage can be left alone.

SUMMARY OF THE INVENTION

The present invention provides microprocessor and/or co-processor circuitry a clock signal that varies its speed depending on the available current from a host power source.

The present invention comprises microcircuitry that maximizes clock frequency by lowering the available voltage and increasing the available supply current. The invention can therefore provide a higher clock rate and more current for switching transistors in an integrated circuit.

This type of circuit is particularly useful in microprocessor applications wherein the microprocessor is used to perform tasks that do not require interrupts, queries, or inputs from users or other devices. Thus, the present invention is particularly useful in microprocessor based devices that perform electronic transactions, encryption, communication, number crunching, repetitive algorithms, robotic control, access control, locking functions, storage and retrieval algorithms, and mathematical functions.

It is envisioned that the present invention could be used, for example, in manufacturing devices, automobiles, electronic keys, electronic locks, encryption devices, postage metering machines, access control devices, inventory devices, automated sensing devices, telecommunication devices, pagers, computers, and battery charging/ maintenance devices, cameras, receivers, transmitters, network devices, computer peripheral devices, and any place where a circuit is attached to a potentially slightly variable power source.

DETAILED DESCRIPTION OF A PREFERRED EXEMPLARY EMBODIMENT

Figure 1:
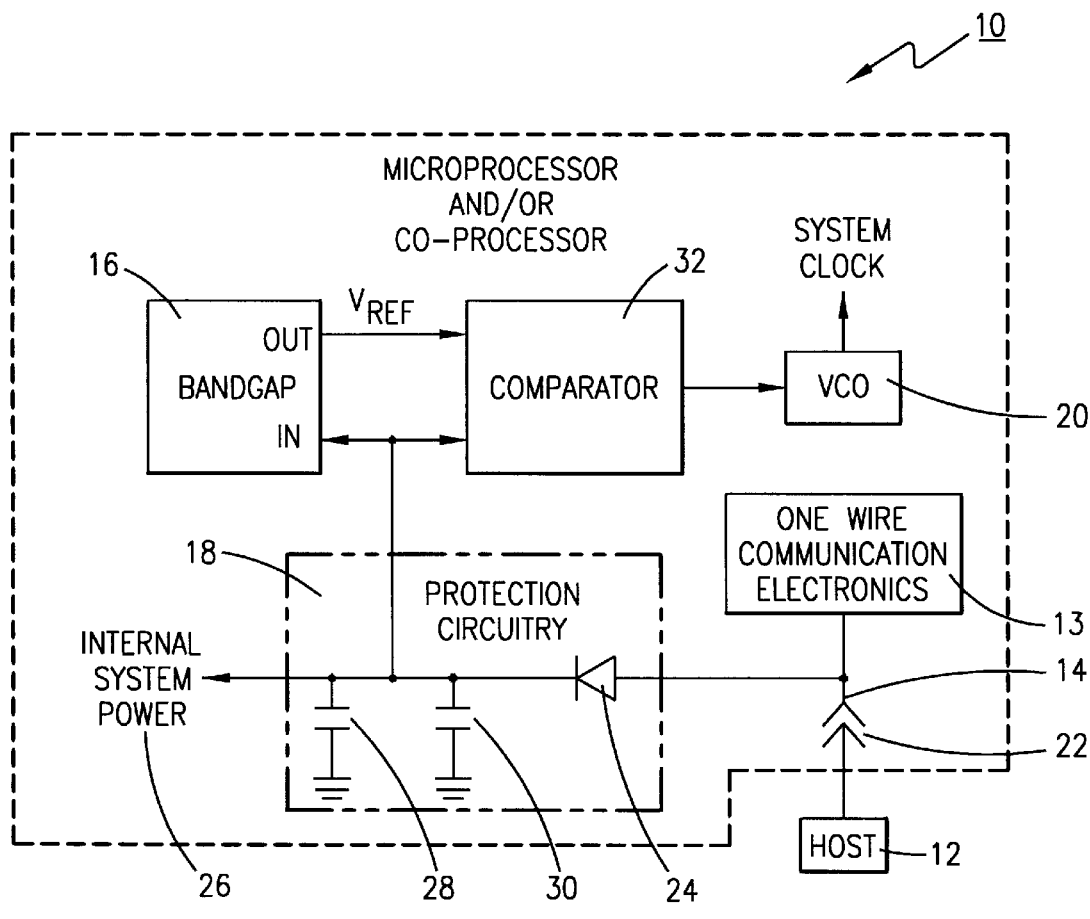

An exemplary embodiment of the present invention is preferably used in a microcircuit device where the amount of current available to the microcircuit is variable. In such a circuit, the exemplary embodiment lowers the operating voltage of the device and increases the clock speed of the device via a voltage controlled oscillator or a variable frequency ring oscillator, or another functionally equivalent device to control the clock rate on which the microcircuitry operates. The current drawn by the microcircuit is substantially the maximum current that can be supplied from the source or host without lowering the operating voltage provided to the microcircuit below a minimum operating voltage.

For example, if a power source can provide five volts, the exemplary embodiment of the present invention may pull the voltage down to three volts. When the voltage is pulled down to three volts, more current can be provided to the microcircuit than when the power source is providing five volts. An added benefit of pulling the voltage down to a lower voltage is that when the microprocessor and/or co-processor operate at voltages lower than, for example, five volts, the circuitry will require less total energy to perform the same calculations at 5 volts with the same current. That is, the clock frequency will be faster at a lower voltage, three volts, than at a higher voltage, five volts and the current will be the greater at the lower voltage then it would be at the higher voltage. More computations are being done with less power by virtue of the fact that the speed of calculation has not suffered by operating at three volts instead of five volts. Thus, the present invention can enable a circuit to perform the same calculation at the same speed even though the voltage supplied to the circuit is different. The net result is a saving of energy.

The higher the clock frequency, the greater the current required to operate the exemplary circuit. Previous microprocessor circuits are designed to operate with a power source that provides all the current needed to operate the microcircuit at a fixed frequency. The exemplary invention, on the other hand, is not designed to operate at a fixed clock frequency. Instead, the exemplary circuit picks an operating current based on the available voltage and current that can be provided by a host circuit. The exemplary circuit selects an operating current such that the microcircuit will operate at the highest possible clock speed without the supply voltage dropping below a predetermined voltage. The predetermined voltage is the lowest voltage required to reliably operate the microcircuit.

Just one example of operation of the exemplary circuit is a microprocessor circuit which is touched to a host in order to obtain operating power. The microprocessor circuit is designed to optimally operate at 33 MHZ while the host is providing five volts and 30–35 milliamps. If the host provides 5 volts, but less than 30–35 milliamps, the exemplary circuitry will reduce the impedance (increase the load of the circuit) characteristics to the host, which will pull more current from the host. This is doubly beneficial. First, more current is provided by the host, and second, the voltage used to operate the microprocessor circuitry is lowered. Consequently, it could take less energy to run the microprocessor circuitry at a higher frequency. The exemplary circuitry should be able to operate at as high as 20 MHZ at 3 volts, with 30–35 milliamps of current. The goal is to get a calculation performed as quickly as possible on a limited amount of voltage and/or current.

Referring to FIG. 1, a first exemplary embodiment of the present invention is depicted. The exemplary current compensated microprocessor clock speed apparatus 10 is connected to a power source or host 12 via a one-wire data bus and power connection 14. It is understood that the connection to the host 12 need not be a one-wire bus connection 14, but may only be a power connection. The power connection 14 can be made by a touch device, direct wiring, a switch, or any technique for connecting power to a circuit.

The host is connected to a band gap circuit 16, via protection circuitry 18. The protection circuitry 18 protects the microcircuitry from spikes, pulses, shorts or other potentially undesirable noise that may be found on or created by the connection to the host 12.

The band gap circuit 16 sets up a reference voltage on the microcircuit when the host 12 applies voltage to the microcircuit 10.

If a one-wire data connection is used, once the one-wire connection goes high, the connection to the host 12 resembles a direct connection to a power source.

Once the host 12 is connected as a power source, the VCO (voltage controlled oscillator) 20 starts up in a slow mode. At this time, the available current from the host 12 is unknown, so the slow VCO 20 will only require a small amount of current from the system. The microprocessor (not shown) can then begin to run its program so long as there is no incremental or time sensitive functions required. The microprocessor preferably will perform calculations at this time.

Transparent to the microprocessor is a state machine which incorporates the VCO 20 and band gap circuitry 16. The VCO 20, in combination with the band gap circuitry 16, monitors the incoming voltage from the host 12 and provides the frequency or clock upon which the microprocessor and/or co-processor operate. So long as the incoming voltage is above a certain point, the band gap 16 and VCO circuitry 20 will increase the clock frequency. As a result, the microprocessor and/or co-processor, whichever is running at the time, will begin to operate faster and faster. The increase in processing speed will translate to a higher current requirement from the host 12 which may consequently lower the host's output voltage. At some point, when the band gap circuitry 16 determines that the voltage has dropped below a predetermined voltage point, the band gap circuitry 16 will "throttle" back the VCO 20 (decrease the clock speed) so that the operating voltage stays above the predetermined minimum voltage.

Furthermore, if the host 12 has sufficient amperage (current to source), the VCO 20 will provide a maximum frequency for operation. The VCO 20 and band gap circuitry 18 operate cynergistically to find the appropriate operating voltage which above the predetermined lower voltage limit, and an operating current operate the microprocessor and/or co-processor at a maximum clock frequency. The object is to provide a maximum clock frequency without lowering the voltage to low or exceeding the current capabilities of the circuitry.

One advantage of the prescribed exemplary embodiment is that the VCO 20 and microprocessor will "track" each other over an operating temperature range. That is, since the VCO 20 and microprocessor circuitry are preferably on the same piece of silicone, they can easily follow each other when the circuit is "cold" and both circuits want to operate faster, or when the temperature of the silicone is "hot" and both circuits will run more slowly.

In a preferred embodiment, a further technique for conserving energy and allowing a co-processor to run as quickly a possible is to place the microprocessor portion of the circuitry in "sleep" mode or in a substantially static state. The result allows more power (voltage and current) to be used by the co-processor portion of the microcircuit and thereby quicken the calculation time.

If an exemplary embodiment is used in a one-wire communication from a host 12 to a microcircuit 10, a protocol must be established so that both data and power can be successfully transferred to and from the microcircuitry 10 and the host. When the microcircuit 10 is touched or connected to the host 12, communication can begin and power can be provided to the microcircuit parasitically. The parasitic power powers up the one-wire circuitry 13 which is on the same chip as the microprocessor, co-processor and/or multiplier circuitry. The microprocessor and co-processor remain in a static state. Data is loaded in a UART via the one wire front end. (The UART is on the same chip as well.) Once the UART is loaded, the host and/or master 12 will send a reset or interrupt signal to the UART. The host 12 will then stop sending data to the UART and the one-wire line 14 will be converted to a power line by pulling it high. The one-wire front end 14 will be held in a static state and the microprocessor and co-processor will begin to run.

As the microprocessor begins to run, it will address the UART and extract data needed to operate. The UART may also be directly connected to the co-processor or math circuitry. The co-processor then begins to take data and mathematically manipulate it in accordance with directions from the microprocessor. The microprocessor may remain in control for a while. The clock speed from the VCO 20 begins to increase and maximizes the current and voltage available from the host in order to allow the microcircuit to efficiently execute the required function and perform calculations as quickly as possible (i.e. at as high a clock rate as possible).

There will be fluctuations in clock speed because of the varied needs of the microprocessor and co-processor circuitry. Thus, when both circuits are operating, the exemplary embodiment may not be able to provide enough current and/or clock speed to operate both at full operational speed.

The exemplary embodiment may place one circuit in a "sleep" or static mode. As a circuit is placed in a static mode the speed of the clock can be increased for the circuits not in static mode.

Referring back to FIG. 1, the microcircuit 10 is touched, connected or somehow brought in contact to a host circuit 12. The host 12 provides power and can also operate as a master for communications to and from the microcircuit.

The power enters the microcircuitry, in which the exemplary embodiment resides, via an electrical connection 22. The power is brought through a diode or equivalent circuitry to the protection circuitry 18 and to provide power to the internal power system 26. The internal power system 26 is circuitry that provides power to the various circuits on the chip. Associated with the protection circuitry 18 are preferably a first and second capacitor 28, 30, one of which is preferably on the chip and the other is preferably off the chip. The capacitors 28, 30 help filter and stabilize the power coming onto the chip so that spikes and other electrical noise will not create major voltage fluctuations.

The voltage is measured and compared by the band gap circuitry 18. The band gap circuitry 18 determines what the reference voltage should be. The reference voltage is an indication of how low the voltage can be pulled down to provide the maximum current to operate the microcircuit without pulling the voltage below a minimum operating voltage.

The reference voltage is input to one side of a comparator circuit 32. The other input to the comparator circuit 32 is the voltage level received from the host. The comparator 32 supplies a signal to the VCO or ring oscillator 20. The VCO 20 produces the system clock for the microprocessor and/or co-processor.

Figure 2:
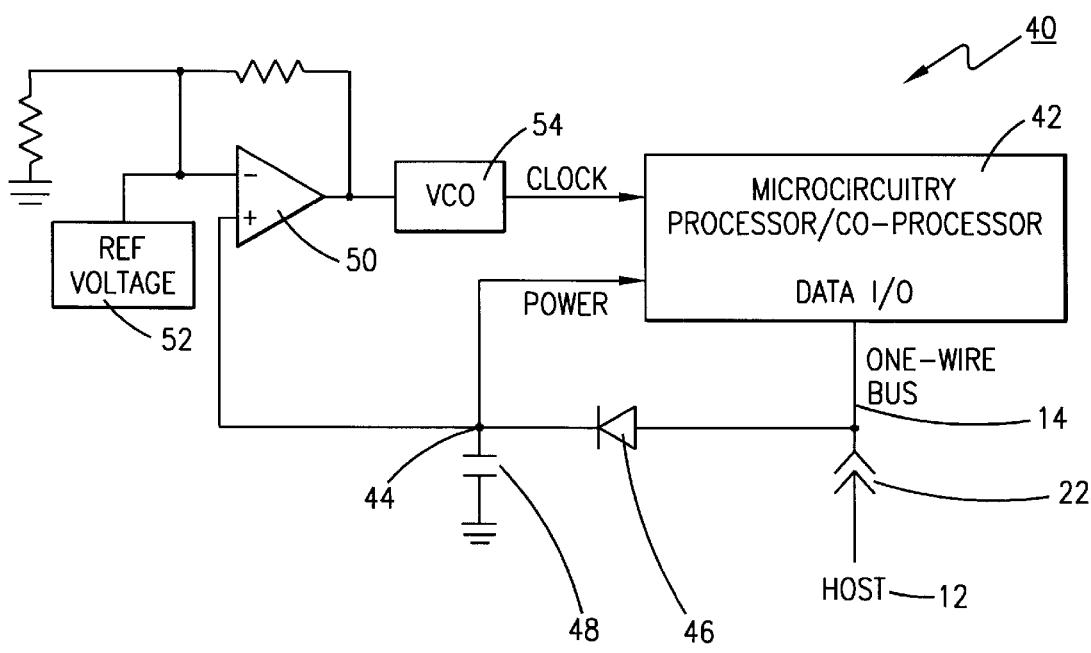

A second exemplary embodiment of the current compensated clock for a microcircuit is found in FIG. 2. a one-wire bus 14 connects the microcircuitry 40 to a host and/or master 12 which supplies power and data respectively. Power from the host 12 is provided to the microcircuit only when the microcircuit 22 is connected in some way to the host 12. An internal system power supply 44 is associated with the microcircuit 42 and is based on a diode and capacitor circuit. The diode 16 and capacitor 48 are used to temporarily hold the energy for internal power to the chip. The internal power is used to power the microprocessor, co-processor and other circuitry associated with the exemplary invention.

A tap from the internal power supply goes to comparator 50 that compares the internal power supply voltage with a reference voltage. The reference voltage is set by a reference voltage circuit 52. The reference voltage is set to a near minimum voltage at which the microcircuitry 40 can operate. The output of the comparator 50 is the difference between the internal system power supply voltage and the reference voltage. The difference (voltage) is used to drive the VCO or ring oscillator 54 in such a way to produce a clock frequency whose frequency is higher when the internal power supply is higher than the reference voltage and whose frequency is lower when the power supply voltage falls to near or below the reference voltage level. When the frequency of the VCO 54 or ring oscillator is low, it causes the microprocessor and/or the co-processor to draw less power from the internal power supply 44. Conversely, the microprocessor and/or co-processor will draw more power when the clock frequency is high.

In essence, the exemplary embodiments of the present invention maximizes the current available to operate a microcircuit by pulling a supply voltage down, as low as a predetermined voltage, so that more current can become available. The present invention provides a variable clock frequency depending on the current available.

The present invention is also unconcerned about temperature variations that may change the operating speed of the circuitry. The present invention's circuitry tracks and operates as efficiently as possible in variable temperature conditions. Typically, one of the most difficult specifications that an engineer must handle while designing integrated circuits is temperature. Temperature is an environmental condition that has an influence on integrated circuit performance. Designers can set voltages and frequencies by hardwired electronics, but must work around environmental conditions like temperature.

The present invention is not concerned about temperature fluctuations because the circuitry tracks itself. Simply put, the circuitry of the present invention is self limiting by tuning the clock frequency based on how much current is available. When the conditions are cold the circuit may run faster than when the circuit is warm. The invention allows the voltage and frequency to be variable while maximizing current. The circuit is self-regulating in terms of performance. It automatically seeks the maximum performance point. The ability for the circuitry to track itself is also due, in part, to the fact that the entire circuit is on a single piece of silicon. Thus, temperature will effect the entire chip equally.

The present invention basically responds to three variables, voltage, frequency and current. If one of the variables change the other two will adjust to meet the requirement. Generally, parts are designed to operate at a particular frequency if they are supplied with a particular voltage. The present invention does not operate this way. Instead, the operating frequency is based on available current.

As is clearly seen, the present invention is a significant improvement in the art. The present invention is believed to be especially effective when configured and employed as described herein, however, those skilled in the art will realize and readily recognize that the present invention can have numerous variations and substitutions and still achieve substantially the same results as achieved by the exemplary embodiments. Thus, the foregoing detailed description is to be clearly understood as being given by way of illustration and example only.

What is claimed is:

1. A clock circuit for a microcontroller comprising: a contact point for connection of said clock circuit to an interruptible power source;

a protection circuit for protecting said clock circuit from disturbances in the power supplied from the power source a band gap circuit coupled to said protection circuit so as to receive the power supplied at said contact point for supplying a reference voltage;

a comparator circuit coupled to receive the power supplied at the contact point and the reference voltage;

a voltage controlled oscillator coupled to said comparator circuit and has at least three modes, wherein a first of said modes is slower than the second mode which is at least one normal operating mode and wherein said slow mode is entered upon an initial start up of said voltage controlled oscillator and wherein a third mode is a sleep mode and wherein the second mode has a plurality of frequencies at which said voltage controlled oscillator is operable;

a state machine coupled to said voltage controlled oscillator and said comparator circuit adjusts the mode of said voltage controlled oscillator wherein in said second mode the frequencies are adjusted such that the power supplied from the power source stays above a predetermined level.

* * * * *